(12) United States Patent
MacFarlane et al.

(10) Patent No.: US 8,113,989 B2
(45) Date of Patent: Feb. 14, 2012

(54) CONTROL OF SEQUENTIAL DOWNSHIFTS IN A TRANSMISSION

(75) Inventors: Kevin MacFarlane, Northville, MI (US); Timothy Merlino, Ann Arbor, MI (US); Than Pham, Livonia, MI (US); Barbara Anne Hartline, Plymouth, MI (US); Michael Tarrant, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 646 days.

(21) Appl. No.: 12/243,998

(22) Filed: Oct. 2, 2008

(65) Prior Publication Data

US 2010/0087293 A1 Apr. 8, 2010

(51) Int. Cl.
*F16H 61/00* (2006.01)
*B60W 10/02* (2006.01)
(52) U.S. Cl. ........................... 477/144; 477/143
(58) Field of Classification Search ................. 477/144, 477/143
See application file for complete search history.

(56) References Cited

U.S. PATENT DOCUMENTS

| | | | |
|---|---|---|---|
| 6,270,444 B1 | 8/2001 | Tsutsui et al. | |
| 6,577,939 B1 | 6/2003 | Keyse et al. | |
| 6,616,560 B2 * | 9/2003 | Hayabuchi et al. | 475/116 |
| 6,626,786 B2 * | 9/2003 | Hayabuchi et al. | 475/127 |
| 7,048,673 B2 | 5/2006 | Shim et al. | |
| 7,216,025 B2 | 5/2007 | Keyse et al. | |
| 7,713,170 B2 * | 5/2010 | Jeon | 477/162 |
| 7,905,814 B2 * | 3/2011 | Lee | 477/144 |
| 2002/0151409 A1 | 10/2002 | Hayabuchi et al. | |
| 2004/0043857 A1 * | 3/2004 | Nishida et al. | 475/125 |
| 2007/0214906 A1 | 9/2007 | Fahland et al. | |

* cited by examiner

*Primary Examiner* — David D Le
*Assistant Examiner* — Jacob S Scott
(74) *Attorney, Agent, or Firm* — David B. Kelley, Esq.; MacMillan, Sobanski & Todd, LLC

(57) ABSTRACT

A method for executing a downshift in a transmission includes starting disengagement of a second control element after starting disengagement of a first element. Disengagement of the second element starts before starting engagement of a fourth element. A third element is forced to synchronous speed by beginning engagement of the fourth element before engaging the third element. Engagement of the third and fourth elements is completed at the end of the downshift.

11 Claims, 9 Drawing Sheets

| GEAR | CL/A | CL/B | CL/E | CL/D | CL/C |
|------|------|------|------|------|------|
| 1    | X    |      |      | X    |      |
| 2    | X    |      |      |      | X    |
| 3    | X    | X    |      |      |      |
| 4    | X    |      | X    |      |      |
| 5    |      | X    | X    |      |      |
| 6    |      | X    |      |      | X    |
| REV  |      | X    |      | X    |      |

CONTROL OF SEQUENTIAL DOWNSHIFTS IN A TRANSMISSION

BACKGROUND OF THE INVENTION

1. Field of the Invention

This invention relates generally to automatic transmissions for automotive vehicles, in particular to transmissions comprising planetary gearsets operated by friction control elements.

2. Description of the Prior Art

It is difficult to achieve acceptable shift quality on sequential, i.e., continuous downshifts, such as a 6-4-3 or 5-3-2 downshift, in an automatic transmission because a torque disturbance may occur during the transition from the first to the second portion of the shift. In order to execute the transition smoothly, the offgoing control element, a clutch or brake, for the second shift must slip before the oncoming element of the first shift gains torque capacity.

The shifts are difficult to calibrate robustly. If the offgoing element slips too soon, a neutral interval occurs near the end of the shift. Conversely, if the offgoing element slips too late, a torque bump occurs as the oncoming element of the first shift gains capacity.

To achieve acceptable feel, the oncoming and offgoing elements must be closely synchronized. But precise synchronization is difficult to achieve under all operating conditions.

The period required to execute successive downshifts between adjacent gears using conventional control techniques is unacceptable approximating 1.2 seconds to complete such downshifts. There is a need in the industry for a control strategy that permits successive downshifts to be completed smoothly and within an acceptably short period.

SUMMARY OF THE INVENTION

A method for executing a sequential downshift in a transmission includes disengaging a first element and starting disengagement of a second element, forcing a third element toward synchronous speed by increasing to a low capacity a torque capacity of the fourth element before engaging the third element, and engaging the third and fourth elements.

With this control strategy, there is no need to precisely synchronize the oncoming element of the first shift with the offgoing element of the second shift. Shift time is equivalent to that of a 6-2 direct downshift, providing greater consistency among the power on downshifts.

The control maintains output torque during the ratio change and allows for change of mind to the intermediate gear. Should the driver tip out early enough in the shift, the first oncoming element is applied and the second shift is cancelled. In addition, the final on coming element may be pre-staged to allow a continuous ratio change if the driver tips into a 6-4 or 5-3 downshift in progress.

Early application of the second on-coming element increases energy dissipation. The time the clutch applied, however, is significantly less than during equivalent downshifts using another control strategy.

It is no longer necessary to perform single step interlocked downshifts to achieve high shift quality. Shift time is short and provides greater consistency among downshifts. The control is robust, easy to calibrate and provides fast smooth downshifts.

This control strategy eliminates the need for close synchronization, allowing the offgoing element of the second shift to be released late enough to avoid a neutral interval. In addition, torque from the final oncoming element helps the ratio change to progress through the intermediate gear ratio. This approach maintains output torque and allows for change of mind to the intermediate gear. Should the driver tip out early enough in the shift, the first oncoming element is applied and the second shift is cancelled.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figures 1, 2:
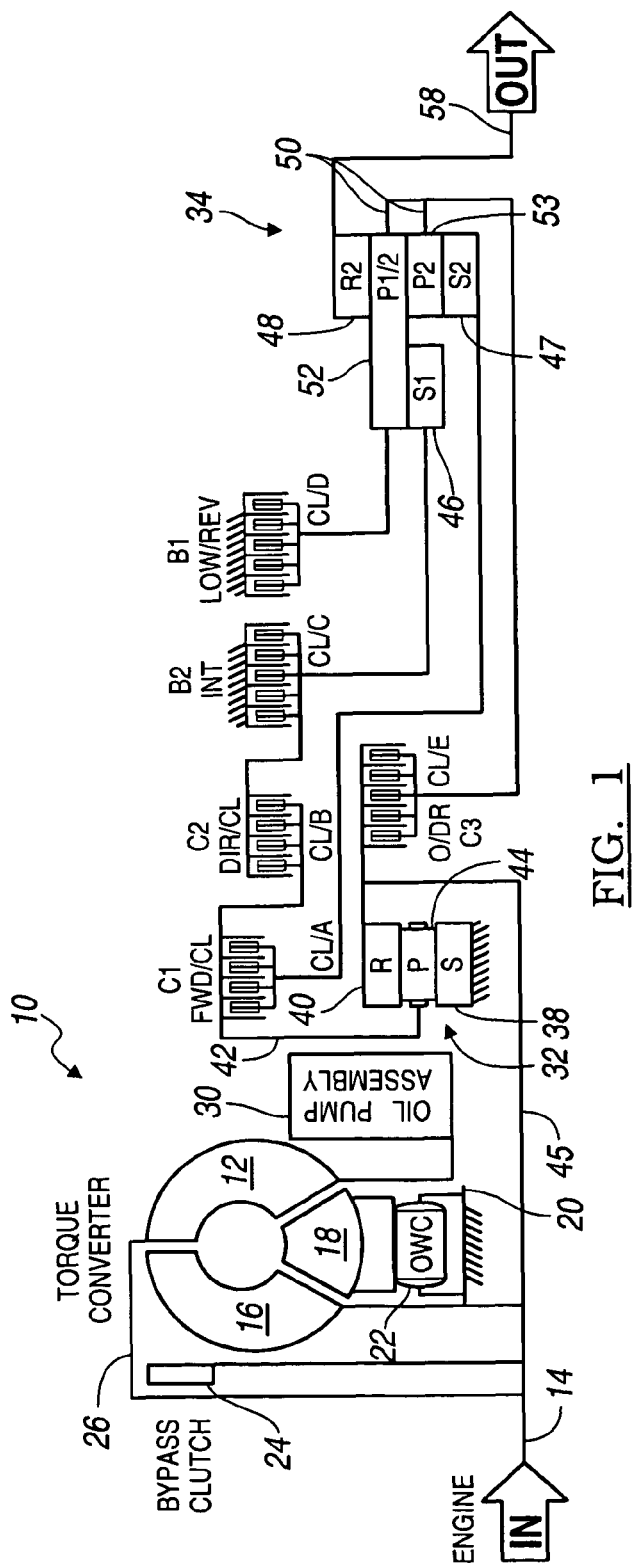
FIG. 1 is a schematic diagram showing the kinematic arrangement of an automatic transmission.
FIG. 2 shows the selective table of friction elements.

Referring now to the drawings, there is illustrated in FIG. 1 the kinematic arrangement of an automatic transmission. The torque converter 10 includes an impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter assembly includes a lockup or bypass clutch 24 located within the torque converter impeller housing 25. When clutch 24 is engaged, the turbine and impeller are mechanically connected; when clutch 24 is disengaged, they are hydrokinetically connected and mechanically disconnected. Fluid contained in the torque converter 10 is supplied from the output of an oil pump assembly 30 and is returned to an oil sump, to which an inlet of the pump is connected hydraulically.

Planetary gearing includes a first simple planetary gear set 32 and a second Ravigneaux planetary gear set 34. The first gear unit 32 includes a sun gear 38, ring gear 40, carrier 42, and planetary pinions 44, supported on carrier 42 in meshing engagement with sun gear 38 and ring gear 40. Sun gear 38 is fixed against rotation. Ring gear 40 is continually connected to an input shaft 45 and to an overdrive clutch, i.e., CL/E. Carrier is continually connected to a forward clutch, i.e., CL/A, and to a direct clutch, i.e. CL/B, which is connected to an intermediate brake, i.e., CL/C.

The second gear set 34 includes first and second sun gears 46, 47, ring gear 48, carrier 50, and first and second sets of planetary pinions 52, 53 rotatably supported on carrier 50. Pinions 53 are in meshing engagement with sun gear 47. Pinions 52 are in meshing engagement with sun gear 46, ring gear 48 and pinions 53. Sun gear 46 is continually connected to intermediate brake CL/C. Ring gear 40 is continually connected to an output shaft 58. Carrier 50 is continually connected to a low-reverse brake, i.e., CL/D, and to CL/E. Sun gear 47 is continually connected to forward clutch, CL/A. Direct clutch CL/B is connected to intermediate brake CL/C and forward clutch CL/A.

Referring to FIGS. 1 and 2, the first forward gear is produced when clutch CL/A and brake CL/D are engaged. The sun gear 47 is driven at the speed ratio produced by gearset 32, and carrier 50 is held against rotation. Output 58 is driven at the low reduction ratio of the double planetary gearset 34.

In the second forward gear, clutch CL/A and brake CL/C are engaged. The sun gear 47 is driven at the speed ratio produced by gearset 32, and sun gear 46 is held against rotation. Output 58 is driven at the intermediate reduction ratio of the double planetary gearset 34.

In third forward gear, clutches CL/A and CL/B are engaged. Sun gears 46, 47 are driven at the speed ratio produced by gearset 32. Gearset 34 is locked up, and output 58 is driven at the speed ratio produced by gearset 32.

In fourth forward gear, clutches CL/A and CL/E are engaged. The sun gear 47 is driven at the speed ratio produced by gearset 32, and carrier 50 is driven at the speed of input 45. Output 58 is driven at an intermediate speed ratio.

In fifth forward gear, clutches CL/B and CL/E are engaged. Carrier 50 is driven at the speed of input 45, and sun gear 46 is driven at the speed ratio produced by gearset 32. Output 58 is driven at an intermediate overdrive ratio through gearset 34.

In sixth gear, clutch CL/E and brake CL/C are engaged. Carrier 50 is driven at the speed of input 45, and sun gear 46 is fixed against rotation by brake CL/C. Output 58 is driven at the entire overdrive ratio of gearset 34.

In reverse drive, clutch CL/B and brake CL/D are engaged. Brake CL/D holds carrier 50 fixed against rotation, and sun gear 46 is driven at the speed ratio produced by gearset 32. Output 58 is driven at the reverse drive ratio of gearset 34.

Each upshift from the current gear to the next higher gear or to the gear that it next higher, and each downshift from the current gear to the next lower gear or to the gear that is next lowest is produced throughout by changing only one of the two friction elements that are engaged in the current gear.

A 6-4-3 downshift begins in sixth gear with clutch CL/E and brake CL/C engaged, advances to fourth gear by disengaging brake CL/C, engaging clutch CL/A and maintaining clutch CL/E engaged, and ends in third gear by disengaging clutch CL/E, engaging clutch CL/B and maintaining clutch CL/A engaged.

For the 6-4-3 downshift, the first control element is brake CL/C, the second control element is clutch CL/E, the third control element is clutch CL/A, and the fourth control element is clutch CL/B.

A 5-3-2 downshift begins in fifth gear with clutches CL/B and CL/E engaged, advances to third gear by disengaging clutch CL/E, and engaging clutches CL/A and CL/B, and ends in second gear by disengaging clutch CL/B, engaging brake CL/C and maintaining clutch CL/A engaged.

For the 5-3-2 downshift, the first control element is clutch CL/E, the second control element is clutch CL/B, the third control element is clutch CL/A, and the fourth control element is brake CL/C.

Figure 3A:
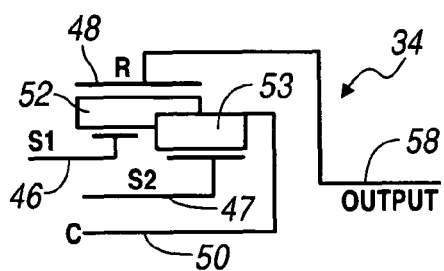
FIGS. 3A and 3B schematically represent the Ravigneaux gearset of FIG. 1.

FIGS. 3A-9 illustrate the kinematics of multi-step downshifts produced by the Ravigneaux gearset 34 in relation to a lever analogy. FIGS. 3A and 3B show that gearset 34 is formed by combining the two gearsets shown in FIGS. 4A-4B and 5A-5B.

Let:
$N_{S1}$=Number of teeth on sun 1.
$\theta_{s1}$=Angular displacement of $S_1$.
$N_{S2}$=Number of teeth on sun 2.
$\theta_{s2}$=Angular displacement of $S_2$.
$N_R$=Number of teeth on ring.

Figure 3B:
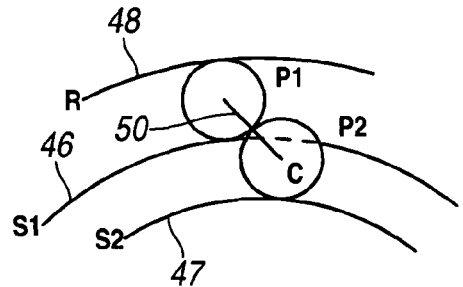

From FIGS. 3A and 3B, if carrier 50 is grounded, i.e., held against rotation, and Sun 1 (sun gear 46) turns $\theta_{s1}$ radians, the circumferential distance Sun 1 travels is $\theta_{s1}*N_{S1}$. Since no slipping occurs between the gears, Sun 2 (sun gear 47) must also travel the same circumferential distance ($\theta_{s1}*S_1$), but in the opposite direction. The angular displacement ratio between Sun 1 and Sun 2 can be represented as follows:

$$\theta_{s1}*N_{S1} = -\theta_{s2}*N_{S2} \rightarrow \frac{\theta_{s2}}{\theta_{s1}} = -\frac{N_{S1}}{N_{S2}} \qquad \text{(Equation 1)}$$

Figure 4A:
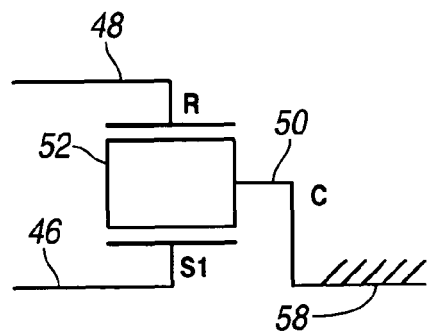
FIGS. 4A and 4B schematically represent a simple planetary portion of the Ravigneaux gearset of FIG. 1.
Figure 4B:
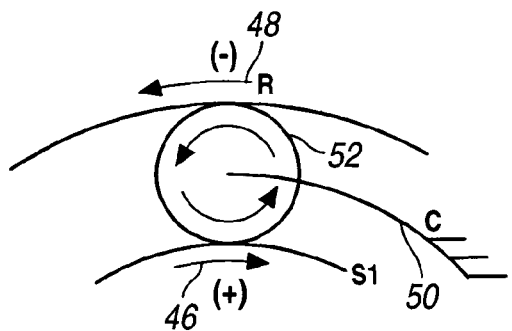
Figure 6:
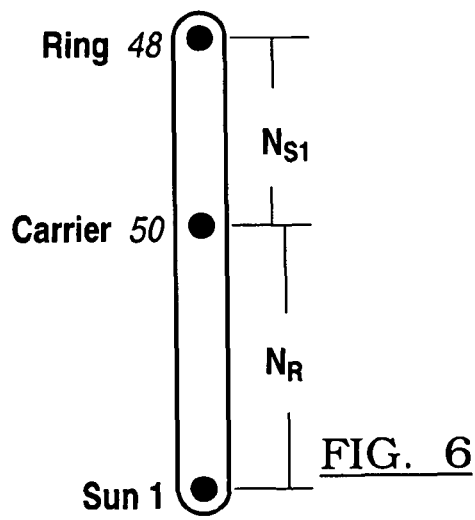
FIG. 6 is a lever representing the kinematics of the planetary portion of the Ravigneaux gearset of FIG. 1.

From FIGS. 4A and 4B, a lever can be constructed as shown in FIG. 6. If C (carrier 50) is held and Sun 1 is the input, then R (ring gear 48) is the output and the angle ratio of this gearset is:

$$\frac{\theta_R}{\theta_{S1}} = -\frac{N_{S1}}{N_R} \qquad \text{(Equation 2)}$$

Figure 5A:
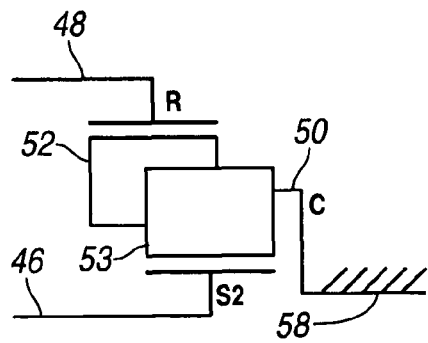
FIGS. 5A and 5B schematically represent a compound planetary portion of Ravigneaux gearset of FIG. 1.
Figure 5B:
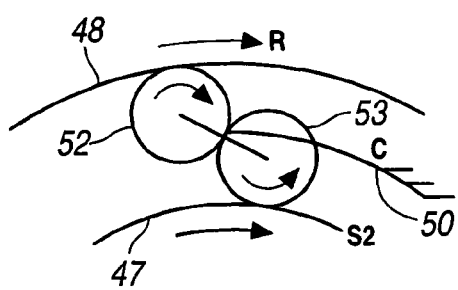
Figure 7:
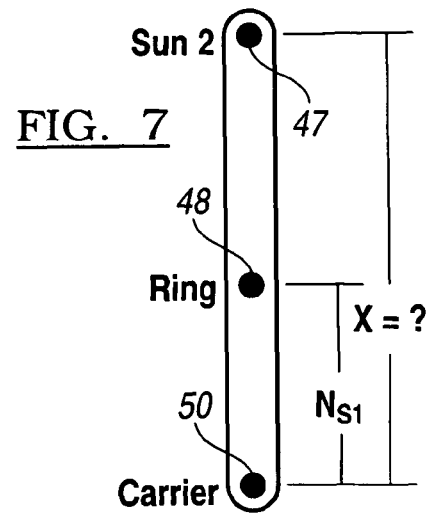
FIG. 7 is a lever representing the kinematics of the compound planetary portion of Ravigneaux gearset of FIG. 1.

From FIGS. 5A and 5B, if C is held, Sun 2 and R rotate in the same direction or Sun 2 and R are on the same side of the lever). Also, the tangential velocity of R is less than the tangential velocity of Sun 2. Thus the lever for the gear set of FIG. 5A is constructed as shown in FIG. 7.

The angular displacement can be written as follows:

$$\frac{\theta_R}{\theta_{S2}} = \frac{N_{S1}}{X} \quad \text{(Equation 3)}$$

From Equations 2 and 3:

$$\frac{\text{Equation 2}}{\text{Equation 3}} = \frac{\theta_{S2}}{\theta_{S1}} = -\frac{X}{N_R} \quad \text{(Equation 4)}$$

Substitute Equation 4 in Equation 1:

$$-\frac{X}{N_R} = -\frac{N_{S1}}{N_{S2}} \rightarrow X = N_R \frac{N_{S1}}{N_{S2}}$$

Figure 8:
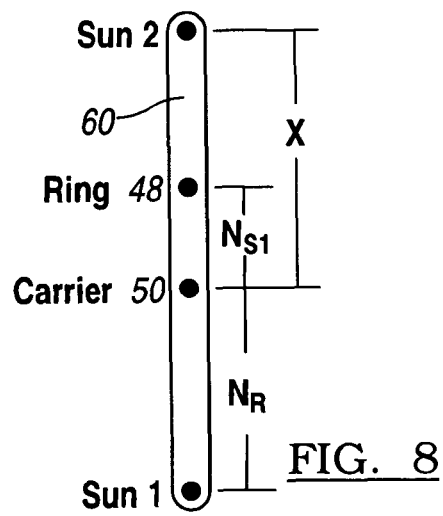
FIG. 8 is a lever that represents the Ravigneaux gearset of FIG. 1 and derived from FIGS. 6 and 7.

Finally, from FIGS. 6 and 7, the lever 60, which represents the Ravigneaux gearset 34, is shown in FIG. 8.

Figure 9:
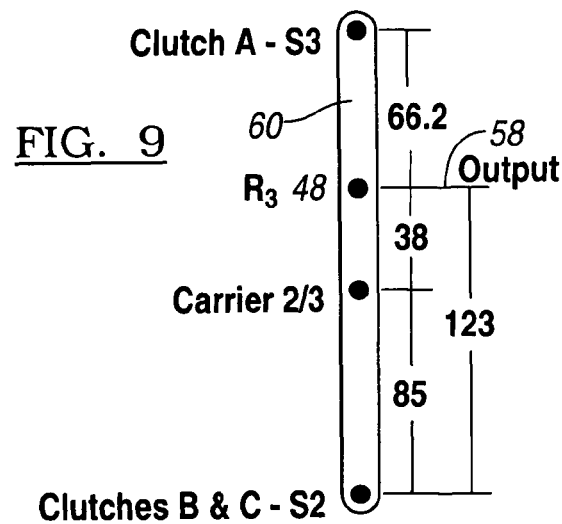
FIG. 9 shows the lever of FIG. 6 with the numeric relationships of a automatic transmission application.

FIG. 9 shows the numerical relationships for a particular transmission application. Since the ring gear 48 is connected to the output shaft 58, any relative motion within gearset 34 causes the lever 60 to pivot about the output 58.

Figure 10:
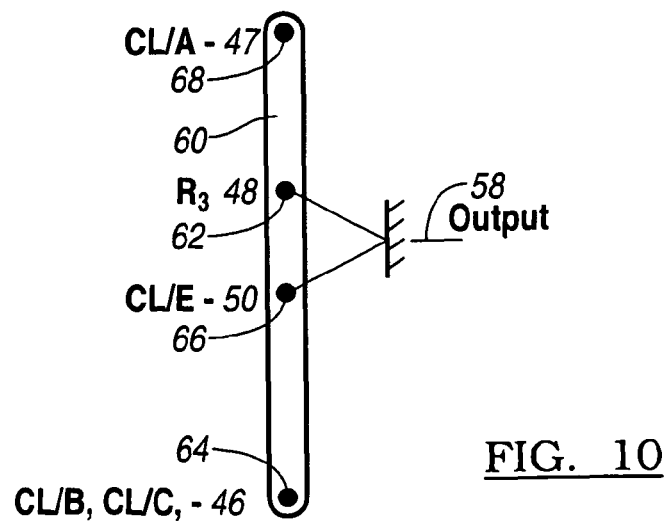
FIG. 10 is a lever diagram representing the Ravigneaux gearset of FIG. 1 with the numeric relationships of the transmission application of FIG. 9.

The lever diagram of FIG. 10 is helpful in understanding the mechanism by which early application of the final oncoming element negates the torque disturbance due to the torque transfer of the first oncoming element. FIG. 10 shows the geometric relationships for the Ravigneaux gearset 34.

Since ring gear 48 is connected to the output shaft 58, any relative motion within gearset 34 causes the lever 60 to pivot about ring gear 48 at point 62. As indicated in FIG. 2, clutch CL/B, brake CL/C and sun gear 46 are connected to lever 60 at point 64. Clutch CL/E and carrier 50 are connected to lever 60 at point 66. Clutch CL/A and sun gear 47 are connected to lever 60 at point 68. Clutch CL/B and brake CL/C have significant mechanical advantage about the output 58 compared to either clutch CL/A or brake CL/E.

Figure 11:
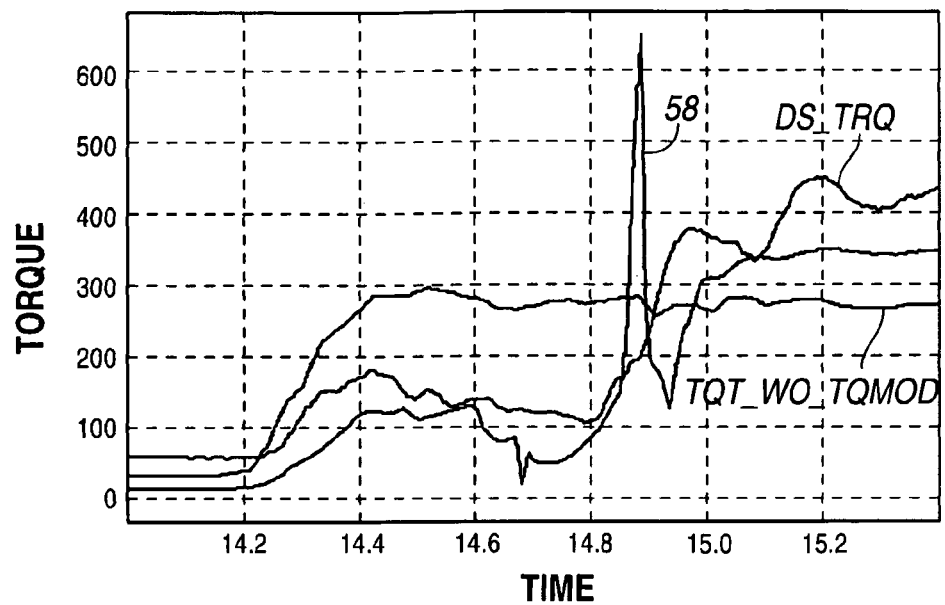
FIG. 11 is a graph showing an abrupt output torque disturbance in the Ravigneaux gearset of FIG. 1 during a downshift.

As FIG. 11 shows, a significant torque disturbance occurs if clutch CL/A gains torque capacity before clutch CL/B. Since clutch CL/E has significant torque capacity, clutch CL/A pulls the transmission back toward the fourth gear. In the figures, DS_TRQ means driveshaft torque and TQT_WO_TQMOD means transmission input torque without torque modulation.

Figure 12:
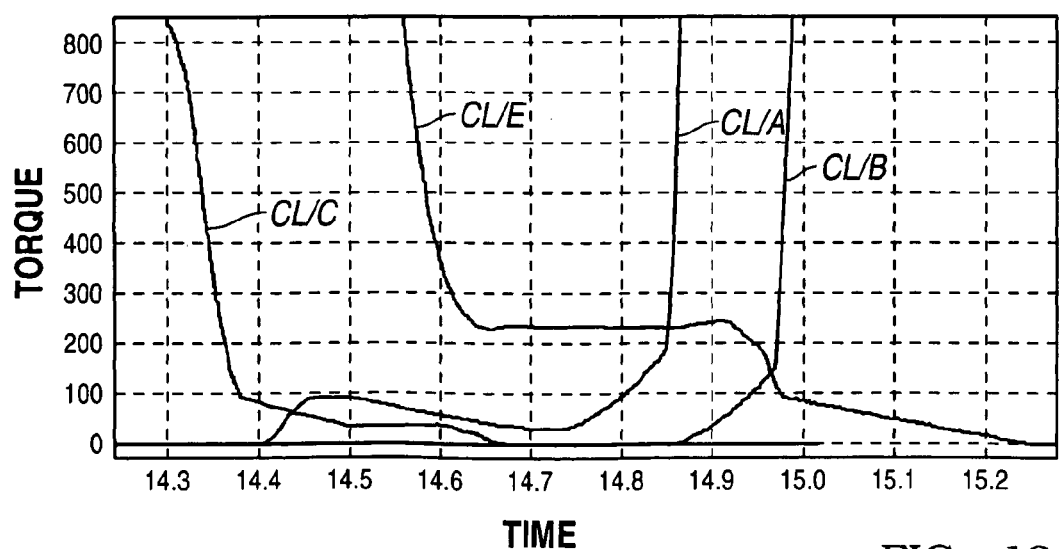
FIG. 12 is a graph showing the variation of clutch and brake torques in the Ravigneaux gearset of FIG. 1 during a downshift wherein CL/B gains capacity later than CL/A.

As FIG. 12 shows, clutch CL/B gains torque capacity significantly later than clutch CL/A.

Figure 13:
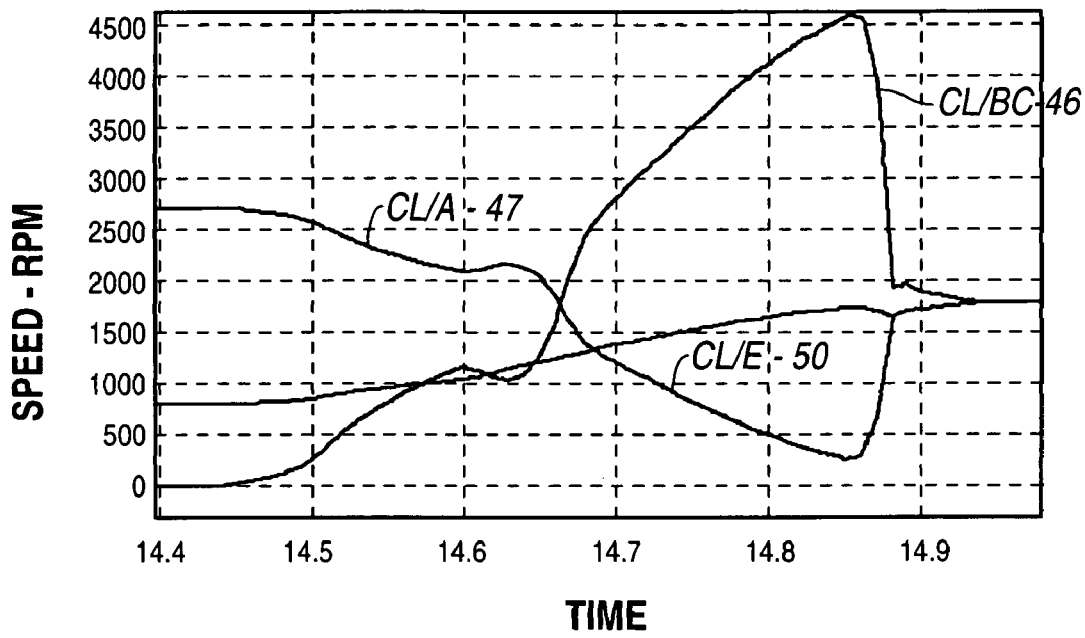
FIG. 13 is a graph showing the variation of clutch and brake torques in the Ravigneaux gearset of FIG. 1 during a downshift wherein CL/A closes rapidly.

As FIG. 13 shows, clutch CL/A closes rapidly, causing the torque disturbance of FIG. 11, and clutch CL/B closes shortly after clutch CL/A closes.

Figure 14:
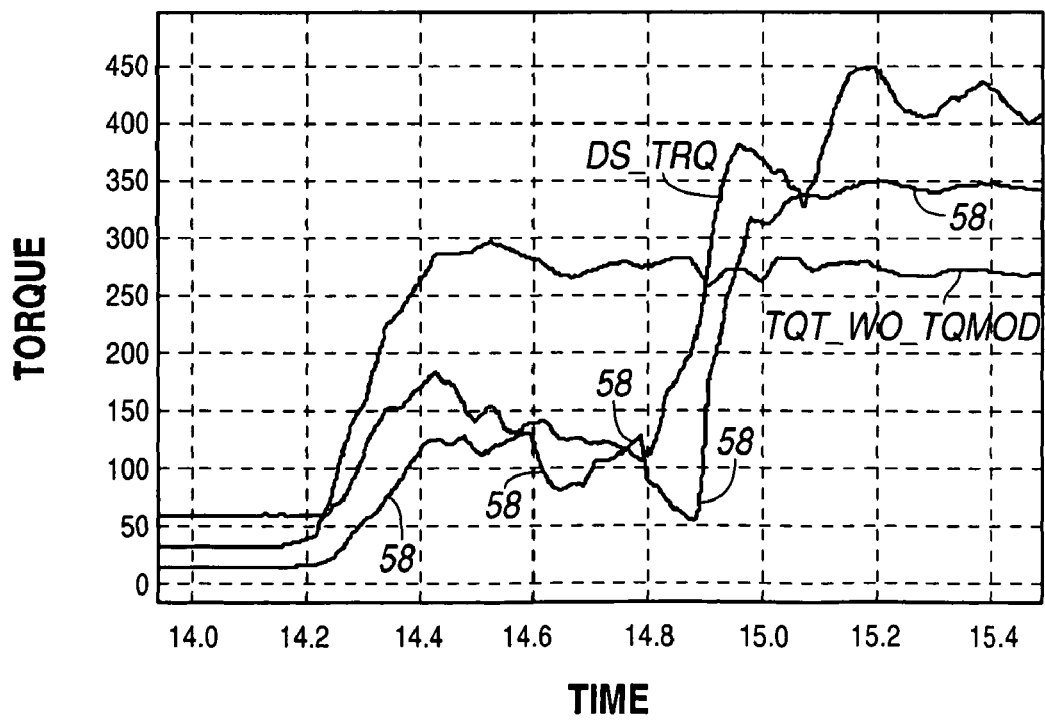
FIG. 14 is a graph showing the variation of output torque in the Ravigneaux gearset of FIG. 1 during a downshift wherein CL/B gains capacity earlier than CL/A.

The simulation torque trace of FIG. 14 closely matches the vehicle torque trace with clutch CL/B applied early. FIG. 14 illustrates a 6-4-3 shift with early application of clutch CL/B at about 4 psi higher pressure than the stroke pressure of clutch CL/B.

Figure 15:
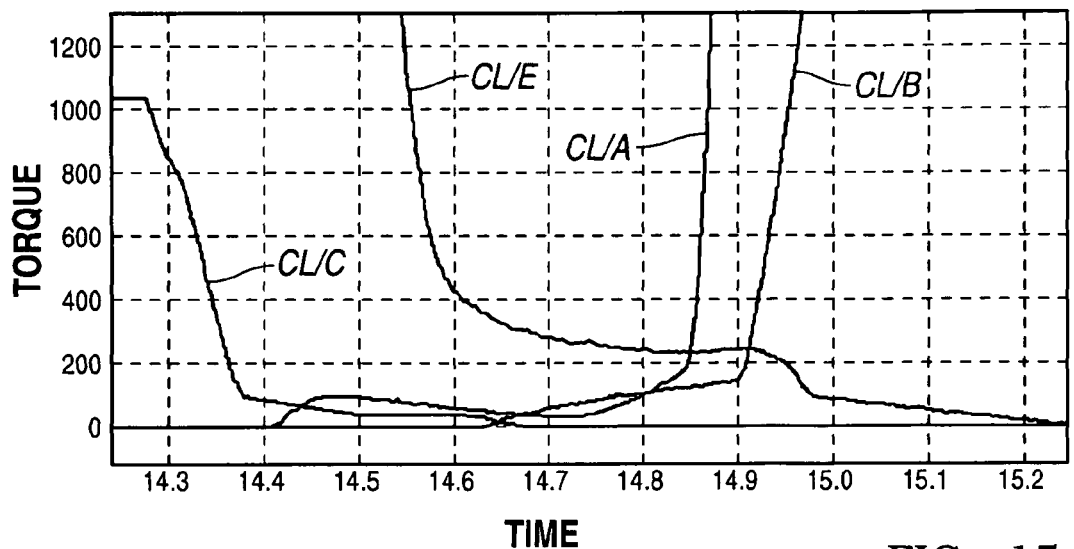
FIG. 15 is a graph showing the variation of clutch and brake torque in the Ravigneaux gearset of FIG. 1 during a downshift wherein CL/B gains capacity earlier than CL/A.

FIG. 15 shows that clutch CL/B gains some torque capacity well before the torque transfer onto clutch CL/A, which closes at low torque capacity as speeds pass through synchronous speed.

Figure 16:
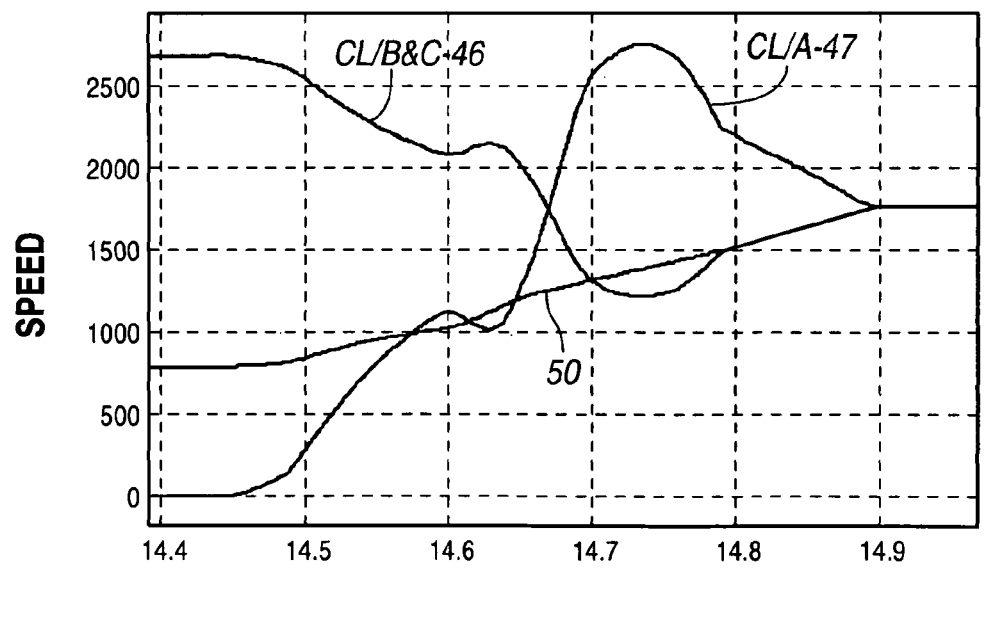
FIG. 16 is a graph showing the variation of element speeds in the Ravigneaux gearset of FIG. 1 during a downshift.

FIG. 16 shows the speeds of sun gear 46, sun gear 47 and carrier 50 near the end of the shift. Torque from clutch CL/B causes the Ravigneaux gearset 34 to move toward the third gear synchronous ratio. In fact, clutch CL/B has closed when the torque transfer onto clutch CL/A begins at approximately 14.75 sec.

Figure 17:
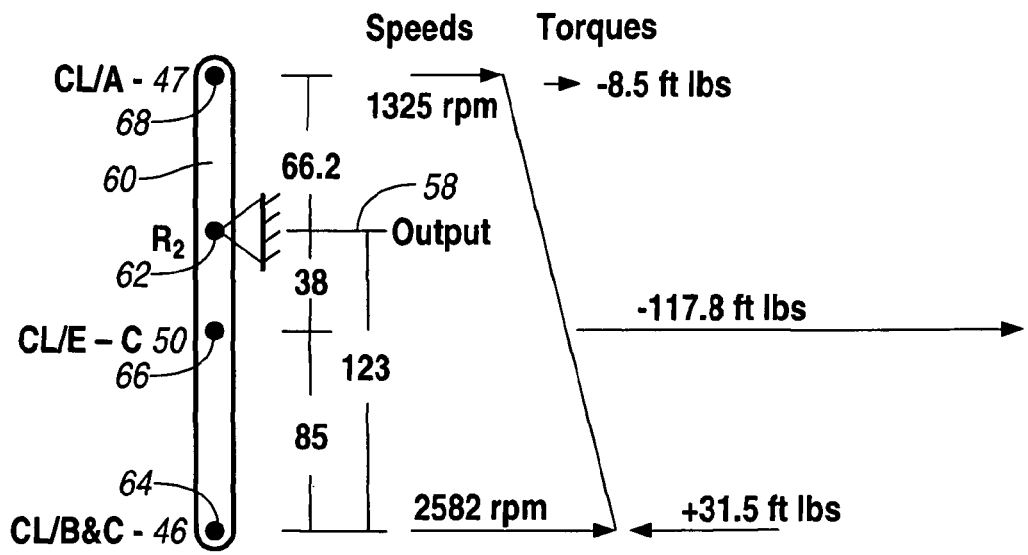
FIGS. 17-20 are lever diagrams in the Ravigneaux gearset of FIG. 1 showing progressive variation of element speeds and element torques during the downshift illustrated in FIG. 16.

FIGS. 16-20 show progressively near the end of a 6-4-3 downshift the variation of element speeds and element torques of the Ravigneaux gearset 34 as it shifts into third gear from fourth gear. As FIGS. 16 and 17 show, at 14.7 sec. after recordation of data begins, the speed of clutch CL/A and sun gear 47 is 1325 rpm, and the speed of clutch CL/B, brake CL/C and sun gear 46 is 2582 rpm, which speeds continue to diverge as shown in FIG. 16. The net torque on gearset 34 is −39.2 ft-lbs.

Due to its mechanical or lever advantage, the torque on gearset 34 due to torque from clutch CL/B nearly equals the torque carried by clutch CL/E. At this point, torque from clutch CL/A aids clutch CL/B in moving the gearset toward a final ratio (1:1).

Figure 18:
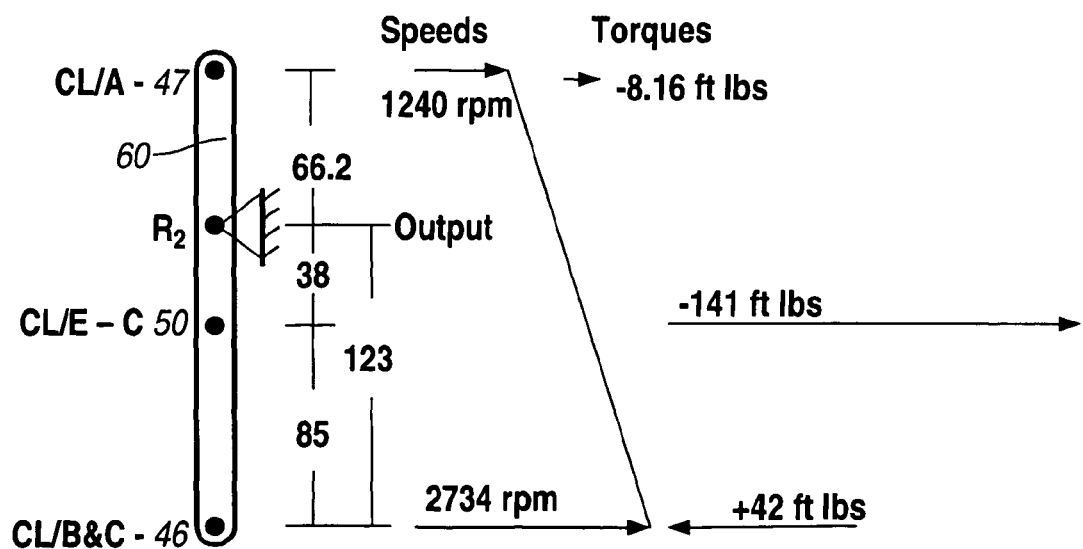

As FIGS. 16 and 18 show, at 14.75 sec, clutch CL/B has sufficient torque capacity for the speeds of clutches CL/A and CL/B to converge. The net torque on gearset 34 is +430 ft-lbs.

Figure 19:
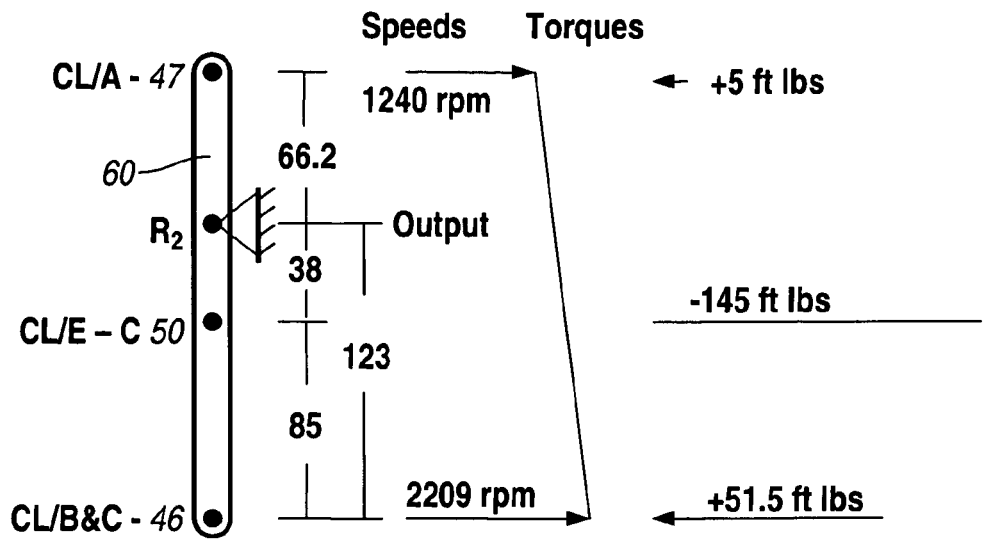

As FIGS. 16 and 19 show, at 14.8 sec, clutch CL/A closes at low torque capacity as gearset element speeds pass through synchronous speed. The speed of clutch CL/A has not changed from 1240 rpm at 14.75 sec. Torque from clutch CL/B has sufficient capacity to oppose the torque from clutch CL/A, which has now changed to a positive direction. The net torque on gearset 34 is +493.5 ft-lbs.

Figure 20:
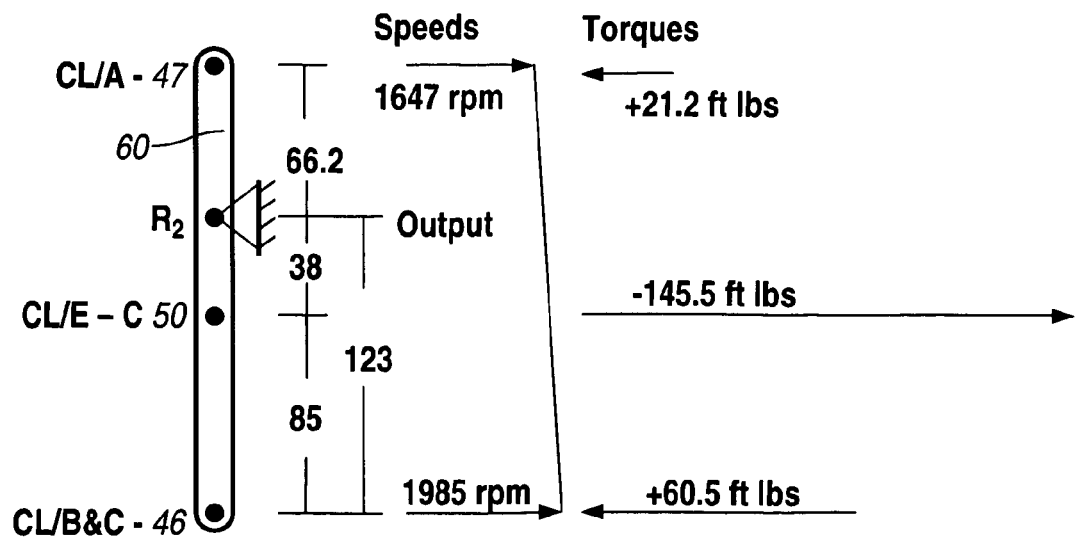

As FIGS. 16 and 20 show, at 14.85 sec, the downshift is nearly complete. Torque from clutch CL/B has sufficient capacity to oppose the rising torque from clutch CL/A. The net torque on the gearset is +512.4 ft-lbs.

Figure 21:
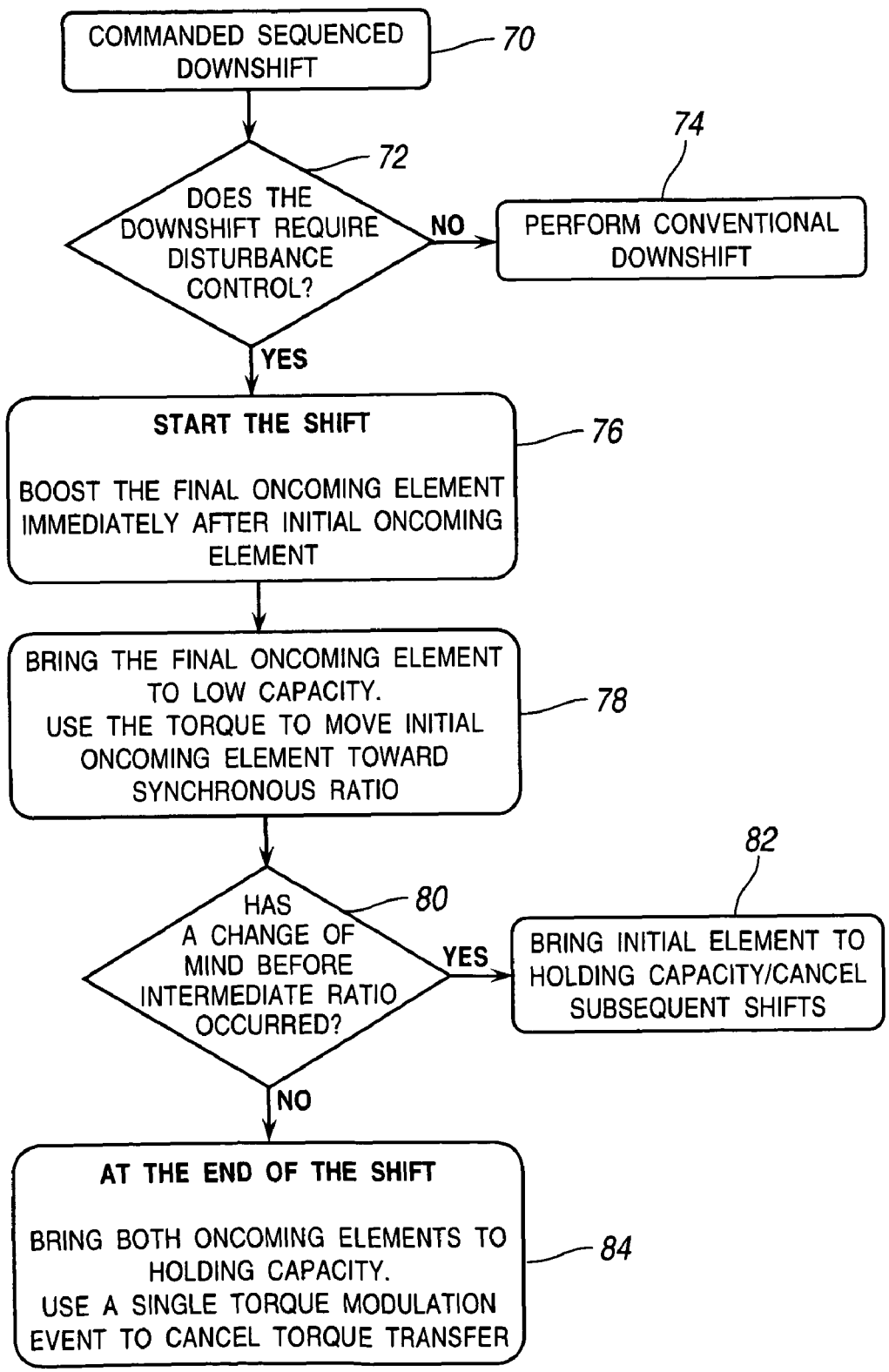
FIG. 21 is diagram of the control logic showing the steps for controlling a downshift in a transmission.

Referring to the logic flow diagram of the control steps of FIG. 21, at step 70, a transmission controller issues a command for a sequenced downshift, such as a 6-4-3 downshift.

At step 72, a check is made to determine whether the commanded downshift requires control of a disturbance of output torque. If the result of test 72 is logically false, control advances to step 74, where a conventional downshift control is executed.

If the result of test 72 is logically true, at step 76 the commanded downshift begins by disengaging the second element (clutch CL/E) after disengaging the first element (brake CL/C). Actuating pressure in the latter oncoming element of the target third gear (clutch CL/B) is boosted after boosting the actuating pressure in the initial oncoming element of the target third gear (clutch CL/A). Boosting pressure, i.e., stroke pressure, causes the piston of the respective element to move in its servo cylinder toward the clutch discs substantially closing all clearances in the servo but without developing torque transmitting capacity in the element.

At step 78, the fourth element (clutch CL/B) is brought to low torque capacity after disengaging the second offgoing element (clutch CL/E).

Engagement of the fourth element (clutch CL/B) at torque low capacity begins before engagement of the third element (clutch CL/A), thereby forcing the third element (clutch CL/A) toward the synchronous speed for the target gear prior to full engagement of the third element (clutch CL/A) and fourth element (clutch CL/B).

At step 80, a check is made to determine whether the vehicle operator has caused a change of mind shift before a downshift to the intermediate gear, i.e., fourth gear has been completed. If the result of test 80 is logically true, control advances to step 82 where clutch CL/A is brought to holding torque capacity and subsequent shifts are cancelled while executing the sequenced downshift control strategy.

If the result of test 80 is logically false, at step 84 the commanded downshift is completed by fully engaging the third element (clutch CL/A) and the fourth element (clutch CL/B) at high capacity, preferably concurrently. Before fully engaging the third element (clutch CL/A) and the fourth element (clutch CL/B) at high capacity, a single torque modulation event is executed by reducing engine output torque to about 50-60 percent of current engine torque for about 100 Msec.

The control strategy for a sequential downshift, such as a 6-4-3 or 5-3-2 downshift, maintains output torque during the gear ratio change and allows for a change of mind shift to the intermediate gear. Should the driver tip-out of the accelerator pedal early enough during the downshift, the first oncoming element is applied and the second shift is cancelled. In addition, the final oncoming control element may be pre-staged to allow a continuous ratio change if the driver tips into a 6-4 or 5-3 downshift while the earlier downshift is in progress.

Early application of the second, oncoming control element (clutch CL/B) increases energy dissipation. The period during which that control element is applied, however, is significantly shorter than it would be during an equivalent downshift using a conventional control strategy.

The solution provides means to calibrate continuous downshifts and to reduce significantly the torque disturbance. Opposing torque from the final oncoming element, clutch CL/B, is used to negate the initial portion of the torque transfer onto the first oncoming element, clutch CL/A. The oncoming element of the second downshift, i.e., clutch CL/B, is boosted and brought to a low torque capacity just before the torque transfer at the end of the first shift. Since the oncoming element of the second shift, clutch CL/B, has low capacity, it only negates the initial portion of the torque transfer. The offgoing element of the second downshift, brake CL/E, must begin the second ratio change before the oncoming element of the first shift, clutch CL/B, gains significantly greater torque capacity than the oncoming element of the second shift.

In accordance with the provisions of the patent statutes, the preferred embodiment has been described. However, it should be noted that the alternate embodiments can be practiced otherwise than as specifically illustrated and described.

The invention claimed is:

1. A method for executing a sequential downshift in a transmission, comprising:
    (a) disengaging a first element and starting to disengage a second element by decreasing pressure in said elements;
    (b) producing stroke pressure in third and fourth elements;
    (c) forcing a third element toward synchronous speed by increasing a torque capacity of a fourth element;
    (d) concurrently increasing pressure steadily in the third and fourth elements to respective fully engaged torque capacities.

2. The method of claim 1 further comprising:
    reducing output torque of a power source connected to the transmission to a range of between fifty and sixty percent of current output torque while executing step (d);
    increasing the output torque of the power source.

3. The method of claim 1 wherein increasing the torque capacity of the fourth element occurs before starting engagement of the third element.

4. The method of claim 1 wherein increasing the torque capacity of the fourth element is performed by supplying actuating pressure at a pressure greater than a stroke pressure of the fourth element.

5. The method of claim 1 wherein completing engagement of the third and fourth elements occurs at relatively a higher pressure than stroke pressure.

6. The method of claim 1 further comprising:
    reducing for a short period the output torque of a power source while executing step (d);
    increasing the output torque of the power source following the period.

7. A method for executing a sequential downshift in a transmission comprising:
    (a) downshifting to an intermediate gear by disengaging a first element and a second element and partially engaging a fourth element at low torque capacity using pressure about four psi greater than stroke pressure of the fourth element;
    (b) forcing a third element toward synchronous speed before engaging the third element;
    (c) fully engaging the third and fourth elements.

8. The method of claim 7 further comprising boosting the third element and the fourth element while disengaging the first element and the second element.

9. The method of claim 7 wherein step (b) is executed after starting disengagement of the second element and before starting engagement of the third element.

10. The method of claim 7 further comprising performing a torque modulation event by reducing output torque of a power source while executing step (c), and thereafter increasing the output torque of the power source.

11. The method of claim 7 further comprising reducing output torque of a power source connected to the transmission to a range of between fifty and sixty percent of current output torque while executing step (c).

* * * * *